US011032457B2

(12) United States Patent
Jung et al.

(10) Patent No.: US 11,032,457 B2
(45) Date of Patent: Jun. 8, 2021

(54) BIO-SENSING AND EYE-TRACKING SYSTEM

(71) Applicants: The Regents of the University of California, Oakland, CA (US); Tzyy-Ping Jung, San Diego, CA (US); Siddharth Siddharth, La Jolla, CA (US); Terrence Sejnowski, La Jolla, CA (US)

(72) Inventors: Tzyy-Ping Jung, San Diego, CA (US); Siddharth Siddharth, La Jolla, CA (US); Terrence Sejnowski, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 71 days.

(21) Appl. No.: 16/325,567

(22) PCT Filed: Aug. 15, 2017

(86) PCT No.: PCT/US2017/047014
§ 371 (c)(1),
(2) Date: Feb. 14, 2019

(87) PCT Pub. No.: WO2018/035160
PCT Pub. Date: Feb. 22, 2018

(65) Prior Publication Data
US 2019/0174039 A1 Jun. 6, 2019

Related U.S. Application Data

(60) Provisional application No. 62/375,250, filed on Aug. 15, 2016.

(51) Int. Cl.
*H04N 5/225* (2006.01)
*G06K 9/00* (2006.01)
*H04N 7/18* (2006.01)

(52) U.S. Cl.
CPC ....... *H04N 5/2257* (2013.01); *G06K 9/00228* (2013.01); *G06K 9/00597* (2013.01); *H04N 5/2258* (2013.01); *H04N 7/181* (2013.01)

(58) Field of Classification Search
CPC .............. H04N 5/2257; H04N 5/2258; H04N 5/23293; H04N 5/232; H04N 7/181;
(Continued)

(56) References Cited

U.S. PATENT DOCUMENTS 8,942,434 B1 * 1/2015 Karakotsios ....... G06K 9/00597
382/117
9,041,787 B2 5/2015 Andersson et al.
(Continued)

OTHER PUBLICATIONS

ISA, International Search Report and Written Opinion for International Application No. PCT/US17/47014. dated Nov. 3, 2017. 10 pages.
(Continued)

*Primary Examiner* — Pritham D Prabhakher
(74) *Attorney, Agent, or Firm* — Perkins Coie LLP (57) ABSTRACT

Methods, systems, and devices are disclosed for implementing a low-cost wearable multi-modal bio-sensing system capable of recording bio-markers and eye-gaze overlaid on world view in real-world settings. In an exemplary embodiment, a bio-sensing system uses at least two cameras and one or more bio-sensors to record a variety of events and bio-marker data. In another exemplary embodiment, the recorded information is used to track the eye position, calculate the pupil dimensions, and calculate the gaze of a human being. The eye position and dimensions of the pupil can be used for emotion recognition.

20 Claims, 6 Drawing Sheets

(58) Field of Classification Search
CPC ............... H04N 13/398; H04N 13/296; G06K 9/00228; G06K 9/00597; G06K 9/629; G06K 9/0061; G03B 17/00; A61B 3/14; G02C 7/04

See application file for complete search history.

(56) References Cited

U.S. PATENT DOCUMENTS

| | | | | |
|---|---|---|---|---|
| 9,401,050 | B2* | 7/2016 | Cajigas | G09G 5/00 |
| 9,994,228 | B2* | 6/2018 | Krueger | A61B 3/145 |
| 2003/0021601 | A1* | 1/2003 | Goldstein | H04N 5/232 |
| | | | | 396/263 |
| 2009/0237564 | A1* | 9/2009 | Kikinis | H04N 13/398 |
| | | | | 348/584 |
| 2010/0160798 | A1* | 6/2010 | Banet | A61B 5/02133 |
| | | | | 600/490 |
| 2015/0018636 | A1* | 1/2015 | Romesburg | A61B 5/024 |
| | | | | 600/301 |
| 2015/0080746 | A1* | 3/2015 | Bleich | A63B 24/0087 |
| | | | | 600/479 |
| 2016/0103338 | A1 | 4/2016 | Hart et al. | |
| 2016/0148531 | A1* | 5/2016 | Bleich | G09B 19/0038 |
| | | | | 434/247 |
| 2016/0167672 | A1* | 6/2016 | Krueger | A61B 5/7282 |
| | | | | 340/576 |
| 2016/0302711 | A1* | 10/2016 | Frank | A61B 5/746 |
| 2016/0306844 | A1* | 10/2016 | Frank | G06N 7/005 |

OTHER PUBLICATIONS

McDowell, K. et al. "Real-World Neuroimaging Technologies" IEEE Access, 2013, vol. 1, pp. 131-149.

Pollatos, O. et al. "On the relationship between interoceptive awareness, emotional experience, and brain processes" Cognitive Brain Research, 2005, vol. 25, pp. 948-962.

Lin, Y. et al. "Electroencephalographic dynamics of musical emotion perception revealed by independent spectral components" NeuroReport, 2010, vol. 21, pp. 410-415.

* cited by examiner

BIO-SENSING AND EYE-TRACKING SYSTEM

CROSS-REFERENCE TO RELATED APPLICATIONS

This patent document is a 371 National Phase Application of PCT Application No. PCT/US2017/047014 entitled "BIO-SENSING AND EYE-TRACKING SYSTEM" filed on Aug. 15, 2017 which claims priorities to and benefits of U.S. Provisional Patent Application No. 62/375,250 entitled "WEARABLE MULTIMODAL BIOSENSING AND EYE-TRACKING SYSTEM" filed on Aug. 15, 2016. The entire contents of the aforementioned patent applications is incorporated by reference as part of the disclosure of this patent document.

TECHNICAL FIELD

This patent document relates to systems, devices, and processes that use a bio-sensing system.

BACKGROUND

Presently, bio-sensors are restricted to laboratory's restricted environments for experimental data collection. There is no robust yet comfortable system that could be used for data collection in mobile settings or has applications in real-world environments. Traditional bio-sensing systems are not practical for real-world studies at least because they are costly, bulky and not designed for comfort or ease-of-use. Additionally, the bio-sensors are usually assembled together, which requires more time and effort to synchronize and calibrate them. Another issue with traditional bio-sensing systems is that it cannot exactly pinpoint the events happening in the real world to which the subject is responding. As a result, traditional systems usually ask subjects to pinpoints events in a roundabout manner, for example, by pressing a button to mark an event. But, this induces further unreliability and compromises the bio-sensing system's accuracy. For example, the data that is received from the bio-sensors may not correlate well with a user marked event.

SUMMARY

Techniques, systems, and devices are disclosed for implementing a bio-sensing system that is comfortable to wear and can reliably monitor and measure bio-signals such as electroencephalogram (EEG), Electrocardiogram (ECG) that provides heart rate and heart-rate variability measurements, Galvanic Skin Conductance (GSR), electrooculography (EOG), electromyography (EMG), and other bio-sensing markers. The bio-sensing system can also be customized to the bio-sensing needs of the user. For instance, a user can change the bio-sensing system to include sensors for EOG and EMG. In another example, the bio-sensing system can be configured for a user to sense EEG, ECG, and heart rate. In some embodiments, the bio-sensing system is a low-cost, wireless, battery-powered multi-modal bio-sensing system.

In an exemplary embodiment, the bio-sensing system includes two cameras located close to a person's face. One camera, known as a world camera, points away from a person's face and another camera, called an eye camera, points towards a person's eyes. The two cameras can be used by the bio-sensing system to overlay a person's eye-gaze over his or her world view so that events in the real world can be easily tagged with the corresponding bio-signals.

An exemplary embodiment discloses a bio-sensing system. The bio-sensing system comprises a frame structured to be placed on a user's face, a first camera coupled to the frame and facing towards an eye of the user to capture a first set of images of the eye, a second camera coupled to the frame and facing away from the user and configured to capture a second set of images of an environment from the user's perspective, one or more sensors configured to measure biological functions of the user and to generate sensor data, and a computer electrically coupled to the one or more sensors, the first camera and the second camera.

In some embodiments, the computer includes at least one processor in communication with a memory operable to execute instructions to cause the computer to perform a method comprising receiving the first set of images from the first camera, detecting location of a pupil of the eye based on the received first set of images, and calculating coordinates of the pupil and a diameter of the pupil based on the received first set of images.

In some embodiments, the at least one processor is operable to execute instructions to further cause the computer to perform the method comprising calculating a confidence of the pupil being present in the first set of images.

In some embodiments, the at least one processor is operable to execute instructions to further cause the computer to perform the method comprising receiving the second set of images from the second camera, and transmitting the coordinates of the pupil and the second set of images to a remote computer.

In some embodiments, the at least one processor is operable to execute instructions to further cause the computer to perform a method comprising determining user excitement by measuring a rate of increase of the diameter of the pupil.

In some embodiments, the at least one processor is operable to execute instructions to further cause the computer to perform a method comprising detecting one or more objects based on the received second set of images, transmitting coordinates of the detected one or more objects to the remote computer, wherein the remote computer includes at least one second processor in communication with a second memory operable to execute instructions to cause the remote computer to perform a method comprising: highlighting on a display the detected one or more objects.

In some embodiments, the remote computer includes at least one second processor in communication with the second memory operable to execute instructions to cause the remote computer to perform a method comprising: receiving the coordinates of the pupil and the second set of images, prompting the user to look at one or more locations, calibrating a gaze of the user based on the calculated coordinates of the pupil and based on the user's pupil response to the prompting to look at the one or more locations, and overlaying a position of the pupil onto the second set of images.

In some embodiments, the bio-sensing system comprises the one or more sensors comprises a photoplethysmogram (PPG) sensor and an accelerometer, wherein the PPG sensor is configured to generate PPG sensor data by capturing infrared light reflected from the earlobe of the user, and the accelerometer is configured to generate accelerometer data by detecting movement of the user, wherein the at least one processor is operable to execute instructions to further cause the computer to perform the method comprising: filtering the PPG sensor data, filtering the accelerometer data, converting the filtered PPG sensor data to digital PPG sensor data, converting the filtered accelerometer data to digital accelerometer data, estimating, based on the digital accelerometer data, noise contributed from user movement, and removing from the digital PPG sensor data the noise contributed from user movement to obtain a noise filtered PPG sensor data.

In some embodiments, the PPG sensor and the accelerometer are structured to be attached to an earlobe of the user. In some embodiments, a band-pass filter is used to filter the PPG sensor data. In some embodiments, a low-pass filter is used to filter the accelerometer data.

In some embodiments, the one or more sensors further comprises an electroencephalogram (EEG) sensor, wherein the EEG sensor is configured to generate an EEG signal based on electrical activity of a brain of the user, wherein the at least one processor is operable to execute instructions to further cause the computer to perform the method comprising: filtering the EEG signal to remove noise, performing fast Fourier transform (FFT) on the filtered EEG signal to obtain an FFT EEG signal, calculating biomarkers from the FFT EEG signal, calculating heart rate based on the noise filtered PPG sensor data, and measuring heart rate variability based on the noise filtered PPG sensor data.

In some embodiments, the at least one processor is operable to execute instructions to further cause the computer to perform the method comprising: recognizing an emotion of the user based on the determined user excitement, the calculated heart rate, the measured heart rate variability, and the calculated biomarkers, and tagging the emotion of the user associated with the object seen by the user.

In some embodiments, the tagging of the emotion with the object includes recording a time when the user saw the object. In some embodiments, the at least one processor is operable to execute instructions to further cause the computer to perform the method comprising time-stamping the PPG sensor data, the accelerometer data, and the EEG signal to obtain a time-stamped PPG sensor data, a time-stamped accelerometer data, and a time-stamped EEG signal, and synchronizing the time-stamped PPG sensor data, the time-stamped accelerometer data, and the time-stamped EEG signal with the recognized emotions and the calibrated gaze of the user to obtain a synchronized data.

In some embodiments, the bio-sensing system further comprises a wireless transceiver, the at least one processor is operable to execute instructions to further cause the computer to perform the method comprising transmitting, using the wireless transceiver, the synchronized data to the remote computer.

In some embodiments, the first camera is an infrared camera.

In some embodiments, the second camera includes a wide-angle lens.

In some embodiments, the bio-sensing system further comprises a wireless transceiver, the at least one processor is operable to execute instructions to further cause the computer to perform the method comprising transmitting, using the wireless transceiver, the first set of images, the second set of images, and the sensor data to a remote computer.

In some embodiments, the bio-sensing system further comprises a battery electrically coupled to the computer, the first camera, the second camera, and the one or more sensors.

These general and specific aspects may be implemented using a system, a method or a computer program, or any combination of systems, methods, and computer programs

DETAILED DESCRIPTION

In an exemplary embodiment, the disclosed bio-sensing system is scalable to incorporate one or more bio-sensors as needed, and includes a wireless transceiver. In some embodiments, the bio-sensing system is battery-powered. Thus, the bio-sensing system can be used as a mobile system that can be worn comfortably for long periods of time.

Figure 1:
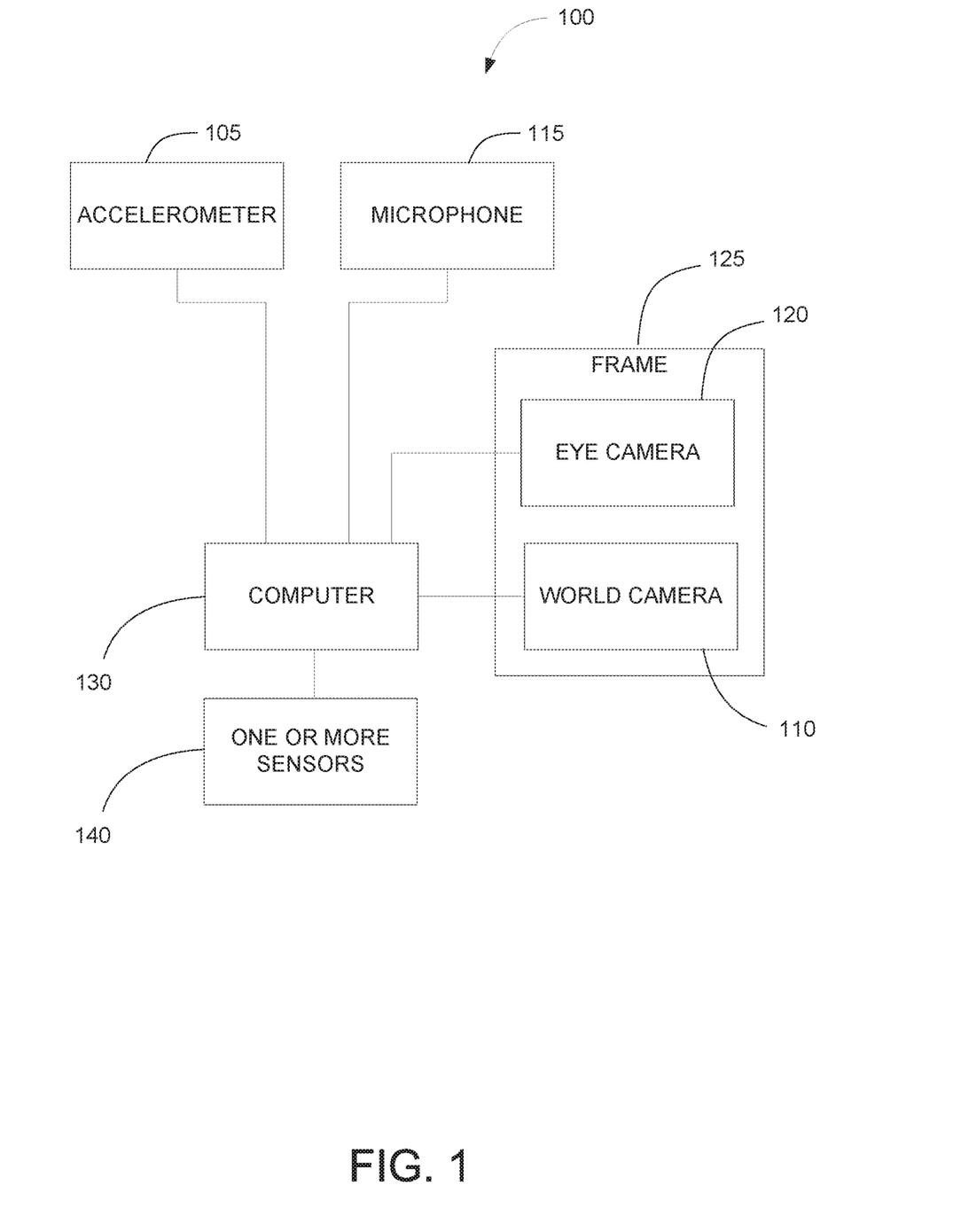
FIG. 1 shows a block diagram of an exemplary bio-sensing system.

FIG. 1 shows a block diagram of an exemplary bio-sensing system worn by a person or a subject. The bio-sensing system (100) includes a frame (125) coupled to a world camera (110) and an eye camera (120). In some embodiments, the frame (125) may include an eye-glass frame that can be placed on a user's face or any frame that can be worn by a user. The world camera (110) is coupled to the frame (125) and faces outward from the subject's view. Thus, one of the functions of the world camera is that it captures in real-time the images or the video of the world as it is seen by the subject. The world camera (110) is electrically coupled to a computer (130). The images or videos captured by the world camera are sent to the computer (130) for additional processing as described in this document. In some embodiments the world camera (110) may be a high resolution wide-angle lens camera. In some embodiments, the computer (130) is a wearable computer. A benefit of using a wearable computer is that it allows the bio-sensing system to be portable so that a user can comfortably wear the various components of the bio-sensing system.

The eye camera (120) is also coupled to the frame (125) and points towards the subject's eye, such as the subject's right eye. The eye camera (120) detects the subject's pupil in real-time to map the eye-gaze and overlay it on the world view. In some embodiments, the detection of the subject's pupil involves detecting the center of the subject's iris. In some embodiments, the eye camera can be an infrared based camera. One of the benefits of using an infrared camera is that it can detect a subject's pupil even in low-light conditions. The eye camera (120) is electrically coupled to a wearable computer (130). The eye camera (120) can produce an image stream at a desired resolution and frames per second and send the image stream to the wearable computer (130) for additional processing as described in this document.

The bio-sensing system uses the at least two cameras to record a variety of events. For example, the wearable computer (130) uses the images captured by the eye camera (120) to find the center of the pupil and map it onto the images captured by world camera (110) as the user's gaze position.

The bio-sensing system includes one or more sensors (140) electrically coupled to the wearable computer (130). The one or more sensors (140) may include biomedical sensors that can measure biological functions and generate sensor data to send to the wearable computer (130). The one or more sensors (140) may include, for example, a photoplethysmogram (PPG) sensor that can be an infrared emitter and receiver able to detect heart rate and heart rate variability from the blood flow in the earlobe. In some embodiments, the bio-sensing system can also include an accelerometer (105) electrically coupled to the wearable computer (105). The signal from the accelerometer (105) can be used by the wearable computer to filter out the noise in the output signal of the PPG sensor due to the subject's movements such as walking or running. The one or more sensors (140) can also include electroencephalogram (EEG) sensors that can be placed on the scalp of the subject to record brain activity in real-time. The bio-sensing system is scalable as it can be used with any desired configuration of bio-sensors or sampling rate as per the target application of the study.

The bio-sensing system uses the one or more bio-sensors to capture and record a variety of bio-marker data. A benefit of using multiple types of bio-sensors is that it allows the bio-sensing system to improve performance. For example, the bio-markers in neurophysiological data, such as electroencephalogram (EEG), can complement and supplement data received from other physiological sensors, for example, Electrocardiogram (ECG), Heart Rate (HR) and Heart Rate Variability (HRV), that can be used to assess human emotion. Thus, the bio-sensing system can be used to compensate the low-spatial resolution and noise in electroencephalogram by using other bio-sensors while also pinpointing the exact event being focused on by the subject.

The bio-sensing system may include a microphone (115) that can be used to record the sound around the subject. In some embodiments, the microphone (115) is used to record the environment around the subject to obtain audio cues from the environment. These audio cues can be used to decipher the environmental context or can be used to provide information about the environment when the subject was interested in some part of the surroundings.

In some embodiments, the bio-sensing system includes a battery (not shown) that provides power to the various components of the bio-sensing system, such as the computer (130), the world camera (110), the eye camera (120), the one or more sensors (140), the accelerometer (105) and the microphone (115). In some embodiments, the battery may be a rechargeable battery. In some embodiments, the battery may also be small enough to include all the sensors and cameras together with the battery into one body.

Figure 2:
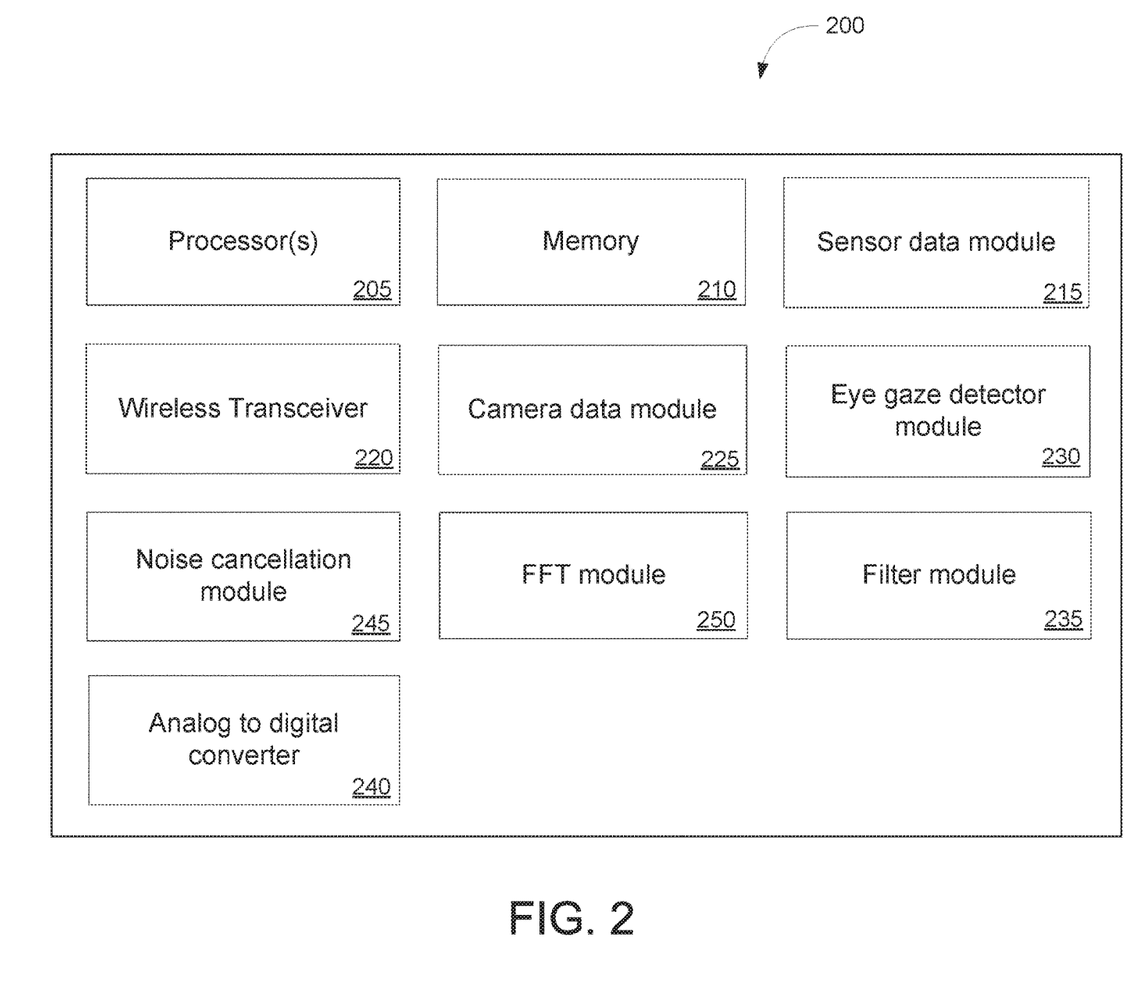
FIG. 2 shows a block diagram of an exemplary computer of the bio-sensing system.

FIG. 2 shows a block diagram of an exemplary wearable computer (200). The wearable computer (200) includes at least one processor (205) in communication with a memory (210) operable to execute instructions to cause the wearable computer to perform several exemplary operations. The wearable computer (200) includes a sensor data module (215) that collects and record data from the one or more sensors. For example, the sensor data module (215) collects data from a one-channel ECG. In another example, the sensor data module (215) collects data from a 14-channel EEG headset. In some embodiments, the number of EEG channels may vary from 1 channel to 128 channels. In some embodiments, the sensor data module (215) may record the sensor data from the one or more sensors on the memory (210) or an attached storage device, such as a hard drive (not shown).

The sensor data module (215) also time stamps each packet data stream received from the one or more sensors. This transmission of data can be wired or wireless using, for example, Bluetooth or Wi-Fi. The time stamped sensor data can be used by the wearable computer to synchronize the data from the one or more sensors with other data collected by the wearable computer. Thus, the data synchronized by the wearable computer can be saved on the wearable computer or it can transmitted by the wearable computer to a remote computer (not shown).

The sensor data module (215) of the wearable computer (200) can also process in real-time data received from the one or more sensors. For example, the sensor data module (215) processes in real-time EEG signals using Independent Component Analysis (ICA) to extract true brain activity and measure valence and arousal. In some embodiments, a remote computer can perform the functions of the sensor data module (215) by receiving sensor data transmitted by the wearable computer. These bio-markers derived from the EEG can be used in an augmented reality (AR) based headset for interacting with environment and augmenting visual experience. For example, the bio-markers may be used to assess user's arousal which can be used to change the environment inside virtual or augmented reality. Furthermore, events such as when a person perceives another person's face can be automatically tagged using eye-gaze since the images received from the world camera can be used by the wearable computer to detect faces in the user's view. The bio-markers from pupil size, EEG and ECG can be used to calculate user's arousal states and heart-rate or heart-rate variability that are directly affected by user's changing emotions. Hence, the emotional response to real-world situations can also be visually displayed to the subject using augmented reality. For example, when the user is frustrated or is stressed, a message can be displayed on a remote computer asking the user to calm down, take a deep breath, or play a game.

The sensor data module (215) may also adjust the sampling rate of the one or more sensors. Different sampling rates for different sensors may be required for various applications or to save battery and computational power. For example, the sampling rate of ECG from 100 Hz can be changed to 200 Hz to get more time resolution while processing ECG data. As another example, the sampling rate of EEG high dimensional data can be reduced to save battery and computational power.

In some embodiments, the wearable computer includes a camera data module (220) that receives and processes the images captured by the world camera and the eye camera. The eye camera's IR image is used to find the center of the pupil. Subsequently, as further described in FIG. 3, a calibration is performed and the center of the pupil is mapped onto the world camera's view as the gaze position.

In some embodiments, the wearable computer includes a wireless transceiver (225) to transmit the data collected by the sensor data module (215) to a remote computer (not shown). In some embodiments, the wireless transceiver (225) may be a Wi-Fi or a Bluetooth transceiver and the transmission of data from the wearable computer to the remote computer may be over the Internet. In some embodiments, the remote computer may be located in a virtual or augmented reality headset. The remote computer includes at least one processor in communication with a memory operable to execute instructions to cause the remote computer to perform several exemplary operations as described in this patent document. The remote computer includes a display that can be used to visualize the data in real time while also synchronizing and recording the incoming data. The remote computer also includes a wireless transceiver, such as a Wi-Fi or a Bluetooth transceiver. Thus, a benefit of using the bio-sensing system is that data can be conveniently transmitted from one location, such as a subject's home, to another location, such as a hospital.

The wearable computer (200) includes an eye-gaze detector module (230). The eye-gaze detector module (230) performs the operations further described in FIG. 3 of this patent document. The wearable computer (200) also includes a filter module (235), an analog to digital converter (240), and a noise cancellation module (245). The operations of the filter module (235), the analog to digital converter (240), and the noise cancellation module (245) are further described in FIG. 4 of this patent document. The operation of the Fast Fourier Transform (FFT) module (250) is further described in FIG. 5.

Figure 3:
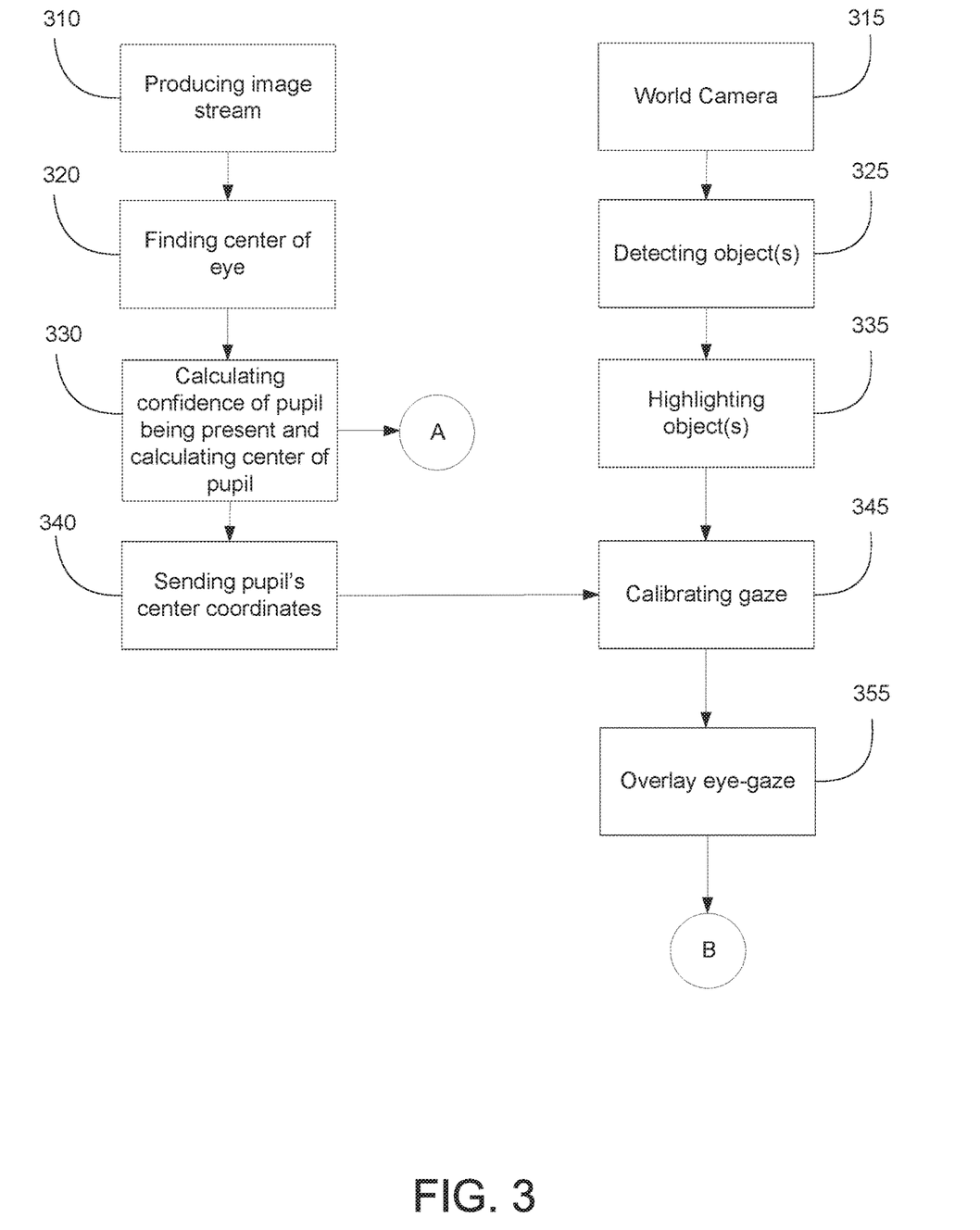
FIG. 3 shows an exemplary process to detect the eye-gaze of a subject.

FIG. 3 shows an exemplary process to detect the eye-gaze of a subject. The left side of the exemplary process is operations performed on data associated with the eye camera, and the right side of the exemplary process is operations performed on data associated with the world camera. The process of FIG. 3 may be implemented in the eye-gaze detector module (230) of the wearable computer or it can be implemented in a similar module on another computer, such as a remote computer.

At the capturing operation (310), the eye camera can produce an image stream at a desired resolution and frames per second depending on the experiment to be performed and hardware constraints of the camera. For example, a desired resolution and frames per second can be 720×480 and 30 fps. At the finding operation (320), the image stream from the eye camera is used to find center of the eye, for example, the location of the pupil. The wearable computer first converts the colored eye image to grayscale, then finding edges in this image. The image with edges is then filtered using histogram of the image to find dark sports and connected components are the found to make sub contours. Finally pupil ellipses candidates are used to calculate the best fitting pupil ellipse the center of which is taken as the location of the eye's pupil.

In some embodiments, at the calculating operation (330), the algorithm calculates the confidence of pupil being present in that particular frame. In some embodiments, the wearable computer calculates the confidence measure by how well the above ellipse conforms to the iris based on its size and other such properties. At the calculating operation (330), the algorithm also calculates the center of the pupil by assuming it to be a perfect circle. The calculating operation (330) also calculates the pupil's size, the coordinates of the pupil, and the diameter of the pupil. At the sending operation (340), the coordinates of the pupil along with the diameter are sent for the calibrating gaze operation (345). In some embodiments, the coordinates of the pupil and the diameter are sent to either a remote computer or a virtual or a virtual or augmented reality headset that performs the calibrating gaze operation (345).

On the right side of FIG. 3, at the capturing operation (315), the world camera captures an image stream. At the detection operation (325), the frames from the image stream can be used to detect one or more objects using, for example, deep learning based algorithm. The algorithm can be pre-trained for some particular objects that are desired to be detected, for example, a car, a person, a chair, or a table. In some embodiments, the wearable computer may perform the detection operation (325) on the image stream to determine coordinates of the one or more objects. In some embodiments, the detection operation (325) may be performed on a remote computer that receives the image stream captured by the world camera and transmitted to the remote computer by the wearable computer.

In some embodiments, at the highlighting operation (335), a remote computer wirelessly receives from the wearable computer the image stream captured by the world camera and the coordinates of the one or more objects detected by the wearable computer. The remote computer highlights the detected one or more objects in real-time in every consecutive frame. In some embodiments, the highlighting can be done inside a virtual or augmented reality based wearable system.

At the calibrating gaze operation (345), gaze is calibrated by getting the pupil's coordinates from the exemplary process described in this patent document and by asking the subject to look at some particular points. The gaze of a user is the location where the user is looking at that moment. In some embodiments, the particular points may be one or more locations in an environment surrounding or chosen by the user. In some other embodiments, the particular points may be, for example, a black dot displayed on a white screen of the display of the remote computer.

The remote computer or a virtual or augmented reality headset performs the calibration gaze operation by asking the subject to look at particular points by displaying these points on, for example, the screen of augmented or virtual reality based system or on the display or screen of the remote computer. The calibration is done mathematically by mapping the coordinate locations of these points in world camera frame to the coordinate location of pupil in eye camera frame. Mapping the position of the pupil with the position of the point(s) in the world camera's image frames is used to create a direct mapping between eye position and the gaze. In some embodiments, the calibration is performed when the user looks at a particular point and presses a mouse button.

At the overlaying operation (355), the result of the calibrating gaze operation (345) is further processed by the remote computer or the virtual or augmented headset. For instance, the remote computer processes the result of the calibrating gaze operation (345) by overlaying the position of the gaze in the image stream of the world camera, and by overlaying the position of pupil in the image stream of the eye camera. Subsequently, the algorithm can automatically detect whether the subject is looking at a particular object and what the subject is interested in.

Figure 4:
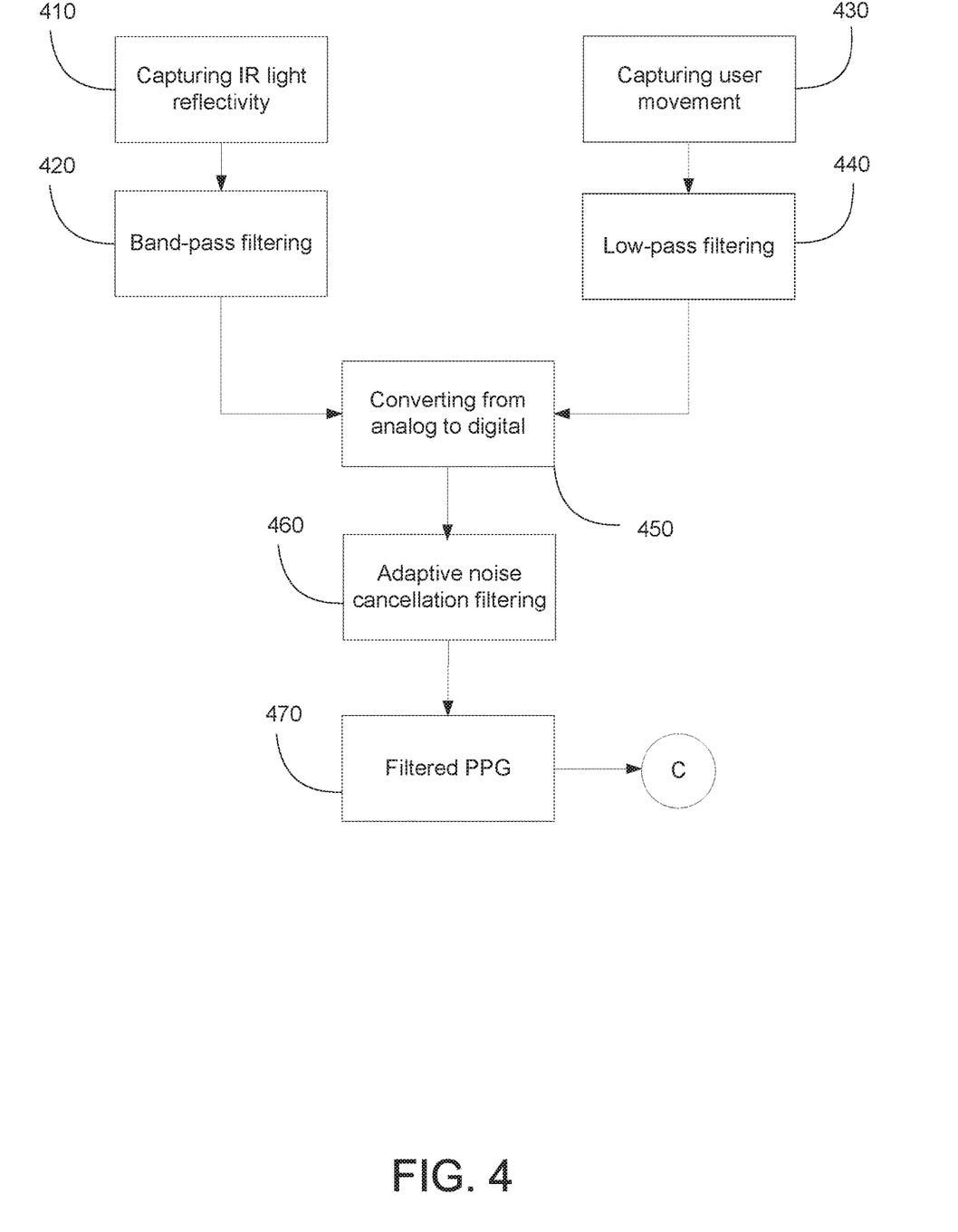
FIG. 4 shows an exemplary process of a bio-sensing system with a photoplethysmogram (PPG) sensor and an accelerometer.

FIG. 4 describes an exemplary flowchart of a bio-sensing system with a photoplethysmogram (PPG) sensor and an accelerometer. A PPG-accelerometer based system includes both the PPG and the accelerometer and can be attached to the earlobe using, for example, a magnet. The PPG-accelerometer based system can be a printed circuit board comprising a PPG, an accelerometer, and one or more filter modules.

At the capturing operation (410), the PPG sensor can capture infrared (IR) light's reflectivity from the earlobe using, for example, an infrared sensor. The reflectivity of the IR light corresponds to the flow of blood in the earlobe. The PPG sensor uses the reflectivity of the IR light to generate PPG sensor data related to detecting volumetric changes in blood in peripheral circulation. At the first filtering operation (420), the PPG sensor data is then sent to a band-pass filter, such as a three stage band-pass filter, for amplifying the signal and remove unnecessary noise. The first filtering operation (420) is performed in the one or more filter modules of the PPG-accelerometer based system.

At the capturing movement operation (430), the accelerometer generates accelerometer data by collecting the biological function data corresponding to the movement of the subject's head or body, such as rotating abruptly, walking, and running. To filter noise, at the second filtering operation (440), the data from accelerometer is sent to a low-pass filter. The second filtering operation (440) is performed in the one or more filter modules of the PPG-accelerometer based system. At the conversion operation (450), the resulting PPG signal and the resulting accelerometer data is converted to digital form using an analog to digital converter (240) of FIG. 2.

At the third filtering operation (460), an adaptive filter is then used to estimate the digitized accelerometer's data as a noise measure and remove the noise from the digitized PPG signal. In some embodiments, the adaptive filter may be an adaptive noise cancellation (ANC) filter. Noise cancellation is used for heart rate calculation using peak-detection assuming it to correspond to the real heart-beats of the subject. This peak detection algorithm works by calculating the slope of the PPG wave at every point and finding local maxima and minima. The output of the adaptive filter corresponds to the cleaned noise-free PPG signal. For example, the false peaks and distortions in PPG signals due to walking may be attenuated to give a cleaner signal corresponding to the actual heart rate and PPG wave generated by the user. In other words, the distortion due to motions that arise in PPG signal can be removed by using the adaptive filter. The third filtering operation (460) may be performed in the filter module (235) of FIG. 2.

At operation (470), the filtered PPG data is obtained.

Figure 5:
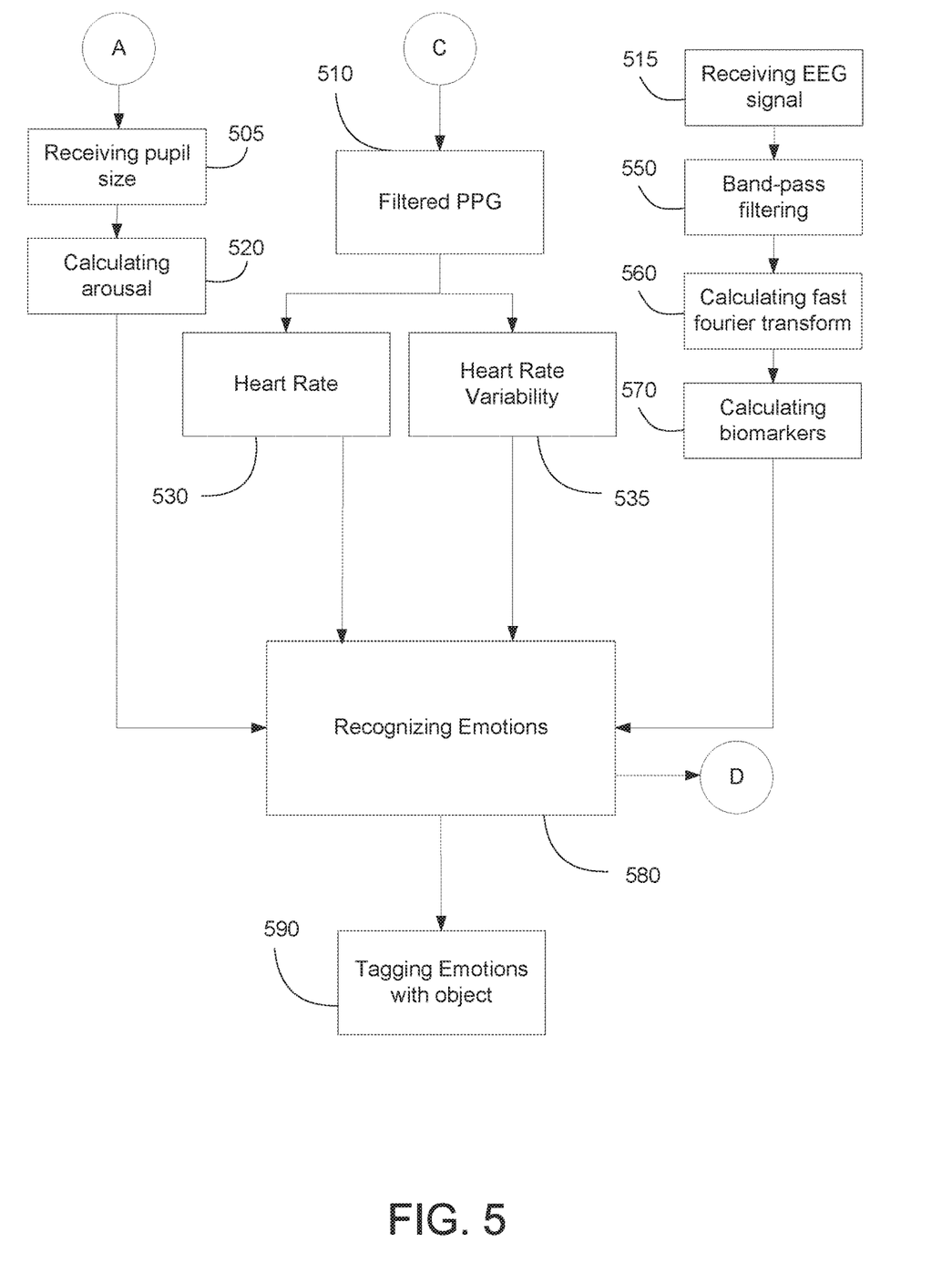
FIG. 5 shows an exemplary process a bio-sensing system for emotion recognition and tagging.

FIG. 5 shows a flowchart used by an exemplary bio-sensing system for emotion recognition and tagging. The process of FIG. 5 may be implemented in the wearable computer or it can be implemented on another computer, such as a remote computer. At the receiving operation (505), the pupil's size and center can be received from the calculating operation (330) of the exemplary process shown in FIG. 3. At the second calculating operation (520), the pupil size, such as pupil diameter, can be used as a measure of an arousal based response to the situation. This can be done by either fixing a threshold or using machine learning algorithms that can be trained by using data from earlier experiments with same or different subjects. The pupil size rapidly increases when a person is highly aroused such as during excitation or fear. In some embodiments, the remote computer can perform the second calculating operation (520) by wirelessly receiving the pupil diameter information from the wearable computer.

The receiving filtered PPG operation (510) receives the filtered PPG data obtained at operation (470) of FIG. 4. At the heart rate calculation (530), the filtered PPG data can be used for heart rate calculation by calculating the number of peaks in the signal using a peak-detection algorithm. In some embodiments, the peaks are found by finding local maxima and minima in PPG wave. Additionally, at the heart-rate variability operation (535), the filtered PPG data can also be used to measure heart-rate variability which is the variability in the heart rate over short intervals of time. This heart-rate variability information is calculated by finding the how large is the deviation in time between successive heart beatings, such as successive peaks in the PPG wave. Heart-rate variability may indicate the mood of the person, such as whether a person had a positive or a negative emotional reaction.

In some embodiments where the one or more sensors of the bio-sensing system includes an electroencephalogram (EEG) sensor. The EEG sensor detects electrical activity in the brain and generates an EEG signal. At the receiving EEG signal operation (515), the EEG signal is received. At the filtering operation (550), the EEG signal is band-pass filtered to remove noise because the EEG signal is susceptible to noise. The filtering operation (550) is performed in the filter module (235) of FIG. 2. At the FFT operation (560), the filtered EEG signal is then transferred to frequency domain using Fast Fourier Transform (FFT) algorithm. The FFT operation (550) is performed in the FFT module (250) of FIG. 2. Frequency domain allows for more efficient analysis of EEG signals.

At the calculating biomarkers operation (570), the bio-markers such as variation in power spectral density can be calculated from frequency domain EEG. Power spectral density can be calculated by finding the power in different EEG bands, such as alpha, beta, gamma EEG bands, using the FFT operation (560) described above. Such changes in power spectral density can act as bio-markers such as when subject closes eyes the highest power spectral density is found in alpha EEG band. Similarly, states like active, calm, focused, or alert are shown as variations in beta band's power spectral density.

At the emotion recognition operation (580), the measured pupil based on arousal, heart-rate, heart-rate variability and EEG based biomarkers are altogether used for emotion recognition, such as anger, sadness, happiness, stress, thrill, boredom, or frustration. Pre-built models are used generated by collecting data over various subjects over a wide range of emotional activities. For example, machine-learning algorithms such as Gaussian Naïve Bayes or deep-learning algorithms can be used to build a model based on the data collected from other subjects and calibrated for the test subject using a small amount of calibration data.

At the tagging operation (590), the bio-sensing system can use eye-gaze information, as described in the exemplary process of FIG. 3 using deep learning algorithms, to determine what object was a person looking at, and at what time did that person look at that object. In some embodiments, the object detection can performed using the image stream of the world camera. Thus, the emotion of the person can be tagged or recorded to that event in the world view of the subject. The determination of the object, the time the person looked at the object, and the emotion of the person can be recorded in a memory or hard drive. An application of the multi-modal bio-sensing system can include emotion recognition studies in outdoor settings.

Figure 6:
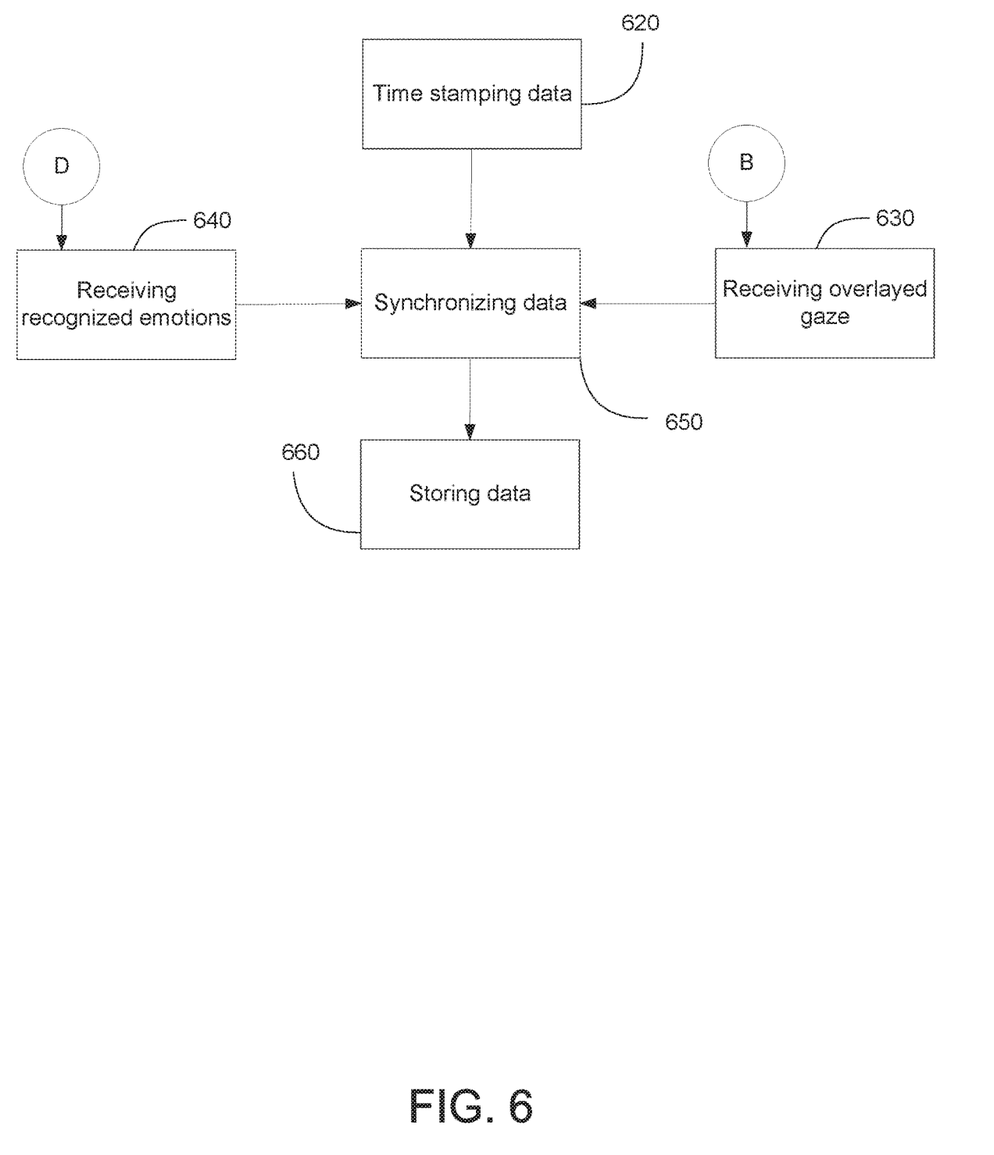
FIG. 6 shows an exemplary data recording and communication based approach for the bio-sensing system.

FIG. 6 shows an exemplary data recording and communication based approach for the bio-sensing system. The wearable computer collects data from the one or more sensors and timestamps the data for synchronization as discussed for the sensor data module (215) of FIG. 2. For example, the computer timestamps the PPG sensor data from a PPG sensor, the accelerometer data from an accelerometer and the EEG signal from an EEG sensor. The wearable computer includes a clock that can be the same for all the sensors, which facilitates synchronization.

At the time stamping data operation (620), the data received from the one or more sensors are time stamped by the wearable computer. At the receiving recognized emotions operation (640), the emotions recognized from the process of FIG. 5 are received. At the synchronizing operation (650), the time stamped data and the recognized emotions data are sent to lab streaming layer, which is a communication protocol being able to synchronize data from various sensors and data from the wearable computer and the remote computer in real-time. For instance, the overlaid gaze from the remote computer is sent to the wearable computer, and the time stamped data is sent from the wearable computer to the remote computer. In embodiments where the wearable computer determines recognizes the emotions, the emotions related data is sent to the remote computer. The synchronizing operation (650) can also reconnect the data stream and buffering in case a delay is induced due to some issue in data acquisition.

The receiving overlaid gaze operation (630) receives the overlay eye-gaze data received from the exemplary process of FIG. 3. At the synchronizing operation (650), the overlay eye-gaze is also sent to lab streaming layer for synchronizing it with the bio-sensing data and recognized emotion. At the storing data operation (660), the streams from lab streaming layer can be recorded and stored on the wearable computer or it can be stored in a remote computer by sending the data in real-time using, for example, Wi-Fi.

Some aspects of the techniques and functional operations described in this specification can be implemented in digital electronic circuitry, or in computer software, firmware, or hardware, including the structural means disclosed in this specification and structural equivalents thereof, or in combinations of them. Some aspects can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

Some aspects of the processes and logic flows described in this specification can be performed by one or more programmable processors executing one or more computer programs to perform functions by operating on input data and generating output. Aspects of the processes and logic flows may be performed by, and apparatus can be implemented as, special purpose logic circuitry, e.g., an FPGA (field programmable gate array) or an ASIC (application specific integrated circuit).

Processors suitable for the execution of a computer program may include, by way of example, both general and special purpose microprocessors, and any one or more processors of any kind of digital computer. A processor typically receives instructions and data from a read-only memory or a random access memory or both. A computer includes a processor for executing instructions and one or more memory devices for storing instructions and data. A computer also typically includes, or is operatively coupled to receive data from or transfer data to, or both, one or more mass storage devices for storing data, e.g., magnetic, magneto optical disks, or optical disks. Devices suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user a computer may include a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers that interact through a communication network or another type of connection. The components of the system can be interconnected by any form or medium of digital data communication, e.g., a communication network. Examples of communication networks include a local area network ("LAN") and a wide area network ("WAN"), e.g., the Internet.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A bio-sensing system, comprising:
a frame structured to be placed on a user's face;
a first camera coupled to the frame and facing towards an eye of the user to capture a first set of images of the eye;
a second camera coupled to the frame and facing away from the user and configured to capture a second set of images of an environment from the user's perspective;
one or more sensors configured to measure biological functions of the user and to generate sensor data,
wherein the one or more sensors comprises a photoplethysmogram (PPG) sensor and an accelerometer,
wherein the PPG sensor and the accelerometer are structured to be attached to an earlobe of the user, wherein the PPG sensor is configured to generate PPG sensor data by capturing infrared light reflected from the earlobe of the user, and wherein the accelerometer is configured to generate accelerometer data by detecting movement of the user; and a computer electrically coupled to the one or more sensors, the first camera and the second camera, wherein the computer includes at least one processor in communication with a memory operable to execute to cause the computer to perform a method comprising:

filtering the PPG sensor data;

filtering the accelerometer data;

converting the filtered PPG sensor data to digital PPG sensor data;

converting the filtered accelerometer data to digital accelerometer data;

estimating, based on the digital accelerometer data, noise contributed from user movement; and removing from the digital PPG sensor data the noise contributed from user movement to obtain a noise filtered PPG sensor data.

2. The bio-sensing system of claim 1, wherein the at least one processor is operable to execute instructions to further cause the computer to perform the method comprising:

receiving the first set of images from the first camera;

detecting location of a pupil of the eye based on the received first set of images; and calculating coordinates of the pupil and a diameter of the pupil based on the received first set of images.

3. The bio-sensing system of claim 2, wherein the at least one processor is operable to execute instructions to further cause the computer to perform the method comprising:

calculating a confidence of the pupil being present in the first set of images.

4. The bio-sensing system of claim 2, wherein the at least one processor is operable to execute instructions to further cause the computer to perform the method comprising:

receiving the second set of images from the second camera;

detecting one or more objects based on the received second set of images;

transmitting the coordinates of the pupil and the second set of images to a remote computer; and transmitting coordinates of the detected one or more objects to the remote computer, wherein the remote computer includes at least one second processor in communication with a second memory operable to execute instructions to cause the remote computer to perform a second method comprising:

highlighting on a display the detected one or more objects.

5. The bio-sensing system of claim 4, wherein the at least one processor is operable to execute instructions to further cause the computer to perform the method comprising:

determining user excitement by measuring a rate of increase of the diameter of the pupil.

6. The bio-sensing system of claim 5, wherein the one or more sensors further comprises an electroencephalogram (EEG) sensor, wherein the EEG sensor is configured to generate an EEG signal based on electrical activity of a brain of the user;

the at least one processor is operable to execute instructions to further cause the computer to perform the method comprising:

filtering the EEG signal to remove noise;

performing fast Fourier transform (FFT) on the filtered EEG signal to obtain an FFT EEG signal;

calculating biomarkers from the FFT EEG signal;

calculating heart rate based on the noise filtered PPG sensor data; and measuring heart rate variability based on the noise filtered PPG sensor data.

7. The bio-sensing system of claim 6, wherein the at least one processor is operable to execute instructions to further cause the computer to perform the method comprising:

recognizing an emotion of the user based on the determined user excitement, the calculated heart rate, the measured heart rate variability, and the calculated biomarkers; and tagging the emotion of the user associated with the object seen by the user.

8. The bio-sensing system of claim 7, wherein the tagging of the emotion with the object includes recording a time when the user saw the object.

9. The bio-sensing system of claim 4, wherein the remote computer includes at least one second processor in communication with the second memory operable to execute instructions to cause the remote computer to perform the second method comprising:

receiving the coordinates of the pupil and the second set of images;

prompting the user to look at one or more locations;

calibrating a gaze of the user based on the calculated coordinates of the pupil and based on the user's pupil response to the prompting to look at the one or more locations; and overlaying a position of the pupil onto the second set of images.

10. The bio-sensing system of claim 1, wherein the first camera is an infrared camera, and wherein the second camera includes a wide-angle lens.

11. A method of operating a bio-sensing system, the method comprising:

receiving, by a first computer, a first set of images from a first camera;

detecting, by the first computer, a location of a pupil of an eye based on the received first set of images; and calculating, by the first computer, coordinates of the pupil and a diameter of the pupil based on the received first set of images;

receiving, by the first computer, a second set of images from a second camera;

transmitting, by the first computer, the coordinates of the pupil and the second set of images to a remote computer;

filtering, by the first computer, photoplethysmogram (PPG) sensor data received from a PPG sensor;

filtering, by the first computer, accelerometer data received from an accelerometer;

converting, by the first computer, the filtered PPG sensor data to digital PPG sensor data;

converting, by the first computer, the filtered accelerometer data to digital accelerometer data;

estimating, by the first computer and based on the digital accelerometer data, noise contributed from user movement; and removing, by the first computer, from the digital PPG sensor data the noise contributed from user movement to obtain a noise filtered PPG sensor data.

12. The method of claim 11, further comprising:

calculating a confidence of the pupil being present in the first set of images.

13. The method of claim 11, further comprising:
determining user excitement by measuring a rate of increase of the diameter of the pupil.

14. The method of claim 13, further comprising:
receiving an electroencephalogram (EEG) signal from an EEG sensor;
filtering the EEG signal to remove noise;
performing fast Fourier transform (FFT) on the filtered EEG signal to obtain an FFT EEG signal;
calculating biomarkers from the FFT EEG signal;
calculating heart rate based on the noise filtered PPG sensor data; and
measuring heart rate variability based on the noise filtered PPG sensor data.

15. The method of claim 14, further comprising:
recognizing an emotion of the user based on the determined user excitement, the calculated heart rate, the measured heart rate variability, and the calculated biomarkers; and
tagging the emotion of the user associated with the object seen by the user.

16. The method of claim 15, wherein the tagging of the emotion with the object includes recording a time when the user saw the object.

17. The method of claim 11, further comprising:
detecting, by the first computer, one or more objects based on the received second set of images; and
transmitting coordinates of the detected one or more objects to the remote computer.

18. The method of claim 11, wherein the first camera is an infrared camera, and wherein the second camera includes a wide-angle lens.

19. A bio-sensing system, comprising:
a frame structured to be placed on a user's face;
a first camera coupled to the frame and facing towards an eye of the user to capture a first set of images of the eye;
a second camera coupled to the frame and facing away from the user and configured to capture a second set of images of an environment from the user's perspective;
one or more sensors configured to measure biological functions of the user and to generate sensor data; and
a computer electrically coupled to the one or more sensors, the first camera and the second camera, wherein the computer includes at least one processor in communication with a memory operable to execute instructions to cause the computer to perform a method comprising:
receiving the first set of images from the first camera;
detecting location of a pupil of the eye based on the received first set of images;
calculating coordinates of the pupil and a diameter of the pupil based on the received first set of images;
receiving the second set of images from the second camera;
detecting one or more objects based on the received second set of images;
transmitting the coordinates of the pupil and the second set of images to a remote computer; and
transmitting coordinates of the detected one or more objects to the remote computer;
wherein the remote computer includes at least one second processor in communication with a second memory operable to execute instructions to cause the remote computer to perform a second method comprising:
receiving the coordinates of the pupil and the second set of images;
prompting the user to look at one or more locations;
calibrating a gaze of the user based on the calculated coordinates of the pupil and based on the user's pupil response to the prompting to look at the one or more locations; and
overlaying a position of the pupil onto the second set of images.

20. The bio-sensing system of claim 19, wherein the at least one processor is operable to execute instructions to further cause the computer to perform the method comprising:
calculating a confidence of the pupil being present in the first set of images.

* * * * *